United States Patent
Conley (10) Patent No.: US 7,559,989 B1
(45) Date of Patent: Jul. 14, 2009

(54) APPARATUS AND METHOD FOR PRODUCING A PATTERNED SHEET AND/OR FILM HAVING A PREDETERMINED SURFACE CHARACTERISTIC

(76) Inventor: Kenneth E. Conley, 3308 Mikelynn La., Matthews, NC (US) 28105

( * ) Notice: Subject to any disclaimer, the term of this patent is extended or adjusted under 35 U.S.C. 154(b) by 703 days.

(21) Appl. No.: 10/999,427

(22) Filed: Nov. 30, 2004

(51) Int. Cl.
B05C 1/08 (2006.01)

(52) U.S. Cl. .................. 118/211; 118/212; 118/642; 118/643

(58) Field of Classification Search ............. 118/211, 118/212, 643, 642; 427/428.08, 428.09, 427/428.1, 428.14, 428.2
See application file for complete search history.

(56) References Cited

U.S. PATENT DOCUMENTS

| | | | |
|---|---|---|---|
| 3,731,620 A * | 5/1973 | Klemmer | 101/23 |
| 4,420,502 A | 12/1983 | Conley | |
| 5,285,238 A | 2/1994 | Quadracci et al. | |
| 5,362,351 A | 11/1994 | Karszes | |
| 6,495,214 B1 * | 12/2002 | Prix et al. | 427/510 |

* cited by examiner

*Primary Examiner*—Laura Edwards
(74) *Attorney, Agent, or Firm*—Jason S. Miller

(57) ABSTRACT

An apparatus for producing a patterned material having a predetermined surface characteristic of high quality and fine definition formed on one side thereof, said apparatus comprising: a cylindrical roll having a peripheral surface of a predetermined texture corresponding to the desired surface characteristic to be produced in the material, corresponding adjustable nip rolls being spaced apart at a predetermined distance to form a fixed narrow gap of predetermined width therebetween, means operatively connected to said cylindrical roll for rotating said cylindrical roll at a predetermined speed of rotation, means for directing the material through the narrow gap onto the peripheral surface of said cylindrical roll and over a predetermined arcuate path therealong, means for applying to the exposed surface of the cylindrical roll as it rotates a coating of a flowable uncured thermosetting resin, means for curing the coating of uncured thermosetting resin while it is in contact with the peripheral surface of said cylindrical roll and the material to cure and harden the coating, means for controlling the coating thickness of the cylindrical roll, and means for directing the material away from said cylindrical roll to thereby separate the cured coating from the peripheral surface of said cylindrical roll and to thus provide a material with a predetermined surface characteristic of high quality and fine definition.

12 Claims, 5 Drawing Sheets

APPARATUS AND METHOD FOR PRODUCING A PATTERNED SHEET AND/OR FILM HAVING A PREDETERMINED SURFACE CHARACTERISTIC

BACKGROUND OF THE INVENTION

1. Field of the Invention

The present invention generally relates to an apparatus and method for producing a composite material having a predetermined surface characteristic formed thereon. More particularly, the present invention relates to an apparatus and method for producing a rigid composite material sheet and/or a flexible web having at least one patterned relief surface of high quality and definition which is particularly useful for producing high quality optical components such as lenticular sheets and/or webs for use with pictures and photographs.

2. Description of the Related Art

In the commercial industry, it is often desirable to impart visual effects such as three dimensionality or motion characteristics upon packages or labels of consumable products and the like. Due to expense and ease of design, regular print advertising was the pre-eminent and preferred form used on consumables. Regular print advertising is accomplished by printing, two-dimensional, non-movable information using words and pictures on packaging, labels, billboards, signs and the like. While some conventional print advertisements and packaging are interesting, most are not. Thus, consumers' attention is not attracted to the fullest extent possible. To obviate this problem, the use of products having lenticular effects has become increasingly popular. A reverse printed lenticular web has the ability to attract ones attention by presenting an image that has depth, morphing characteristics, and/or can appear to have movement or the capacity to flip from one image to another. By way of example, a package or label having a printed lenticular web image on a store self has the ability to attract ones attention for a longer period of time than comparable non-lenticular packages.

Known lenticular lenses, or micro lenses, as used in imaging are typically elongated, lineal or dot patterned across an entire transparent web such that an image may be seen therethrough with the desired visual effect. The lenses can be either convex or concave in configuration. In addition, some lenses can be elliptical in shape. Typically, the lenses have a pre-determined radius of curvature and a pre-determined uniform pitch or repeat pattern. Lenticular lenses are generally thin, transparent lenses that are flat on one side and include a plurality of parallel, linear, side by side lenticules—elongate or convex lenses—on a second side. Typically, an image is printed on the flat side to create a desired visual effect of the image when viewed through the lenticules on the opposing side. The combination of the lenses and an image is referred to as a "lenticular assembly".

Prior art lenticular assemblies are typically manufactured from a continuous thin, flexible web. Manufacture of lenses may be performed in a variety of ways. Generally, lens shapes are engraved on a precision engraving and diamond turning machines into special metal cylinders and polished to a high luster. The lenses are then index/step and repeat engraved to extremely high accuracies measured in the millionths of an inch onto the thin flexible web using an extrusion process. Thereafter, the images to be used are produced by combining or interlacing a selected image on a computer such that the image is produced in a manner ready for printing. Once interlaced, the image is reverse printed on the rear or back, planar side of the lenticular material produced. Reverse printing is accomplished by any conventional method by any conventional printing means. Subsequent to the reverse printing the lenticular assembly is complete.

By way of a specific example, U.S. Pat. No. 4,420,502 to Conley discloses an apparatus and method for producing a flexible sheet material having a predetermined surface characteristic of high quality and definition formed on one side thereof. The apparatus of the U.S. Pat. No. 4,420,502 invention comprises first and second rotating rolls which are mounted on a generally horizontally extending axis with the peripheral surfaces thereof closely spaced from one another to form a narrow gap corresponding to the desired overall thickness of the composite sheet. The second rotating roll has a peripheral surface of a predetermined texture corresponding to the desired surface characteristic to be produced in the sheet. A base web of predetermined thickness less than the narrow gap is directed onto the peripheral surface of the first roll and is advanced along an arcuate path around the periphery of the first roll and then through the narrow gap between the first and second rolls. The base web, upon passing through the narrow gap, is then directed around the second roll and along a predetermined arcuate path around the periphery thereof. A flowable uncured actinic radiation curable thermosetting resin is directed behind the narrow gap between the first and second rolls and into contact with the exposed surface of the base web so that a coating of the resin is applied to the base web and is carried with the base web through the narrow gap to this position the coating, upon emerging from the gap, beneath the base web and in contact with the peripheral surface of the second roll. Then actinic radiation is directed through the base web and onto the coating to cure and harden the coating while in contact with the patterned surface of the second roll. The base web is then directed away from the second roll to separate the cured and hardened coating from the roll and thus produce a sheet with a predetermined surface characteristic of high quality and fine definition accurately reproducing the surface texture of the second roll.

The above described methods of manufacture for lenticular material suffers a number of shortcomings. First, and most importantly, the U.S. Pat. No. 4,420,502 fails to teach of an apparatus and method which is useful for the production of thick, rigid lenticular sheets as well as flexible, thin carrier webs. Rather, the U.S. Pat. No. 4,420,502 only teaches of an apparatus useful with flexible, thin carrier webs. Noticeably too, the U.S. Pat. No. 4,420,502 fails to disclose a doctor blade or other device which is used to meter the coating on the engraving roll for curing and transferring the pattern to the stable carrier web.

In addition, the use of rigid lenticular sheets are rapidly becoming popular, due the need for products, such as signs and billboards, to be more stable and resistant to environmental conditions, such as inclement weather. Similar to the manufacture of the thin flexible webs, various methods of manufacture for thick, lenticular sheets exist. However, as with the thin, flexible webs, conventional methods provide material with less than accurate reproductions of the engraved, patterned roll. Moreover, less stability results from the extrusion of the sheets. For example, when a wide sheet material is desired or required, the extrusion process is undesirable as more distortion of the sheet occurs due to the fact that the product must be cooled and pulled down the line. Currently, known art fails also to provide a machine or method which serves the dual purpose of producing either a flexible material web or a rigid sheet material having a pre-determined characteristic thereon operable for use with lenticular applications.

It is therefore apparent, that there exists a need for an apparatus and method capable of producing a stable patterned rigid sheet or continuous flexible thin web which does not vary in dimensions; which has a more exacting reproduction of the pattern from the engraved cylinder; and which provides the ability to produce wider patterned sheets or webs with stability and exactness; both thick rigid patterned sheets, up to ¼ inch and thin flexible patterned sheet, down to 0.001 inch or less.

BRIEF SUMMARY OF THE INVENTION

To achieve the foregoing and other objects, and in accordance with the purposes of the invention as embodied and broadly described herein, the present invention provides various embodiments of an apparatus and method for producing a rigid patterned sheet and/or flexible web operable for use with lenticular displays and the like. In various embodiments, the present invention can produce either thick rigid sheets or thin, flexible webs operable for use with commercial packaging products, signs and billboards, and/or the like. The present invention provides significant advantages over the prior art by eliminating the need for utilizing distinct machines for the production of rigid sheet material and the production of flexible webs or rolls. The present invention also provides the capability of producing a stable patterned sheet which does not vary in dimensions and which has a more exacting reproduction of the pattern engraved from the cylinder. Small amounts such as a few lineal feet or just one sheet can be made which has not been possible heretofore.

In various embodiments, the present invention provides an apparatus and method for producing a patterned sheet and/or film that has stable characteristics and exacting, uniform dimensions for use with commercial products such as for example, flooring tiles or roll stock, signage, displays, art, labels, fleet graphics and vehicle decoration, any reverse printed or laminated to images, wall coverings, wall panels, murals, projection screens, televisions and computer monitors, packaging such as labels, boxes, bags and/or the like.

The apparatus and method described herein is useful in the production of materials comprising a variety of patterns such as, for example, lenticular patterns such as elongated lenses; fly eye or dot structures; prismatic; holographic; fresnel; pattern in specific areas.

In one exemplary embodiment of the present invention, the apparatus and method for production of a rigid sheet having a predetermined characteristic thereon includes a feed side, a wind up side, an engraved, patterned cylinder, cylindrical nip rolls or guides, a UV lamp, a UV reservoir pan, light shields and a doctor blade for controlling the coating thickness of the rigid sheet. In operation, the rigid composite sheet is directed across the feed side through a first set of nip rolls and then around the peripheral surface of the engraved, patterned cylinder. As the sheet crosses the engraved, patterned cylinder, it is coated with a uncured resin and then exposed to UV radiation from the UV lamp, such that the resin cures and the pattern on the cylinder is transferred to the sheet. Thereafter, the sheet is directed through a second set of nip rolls and across the wind up side.

In another exemplary embodiment of the present invention, the apparatus and method for production of a flexible web having a predetermined characteristic thereon includes a feed side, a wind up side, an engraved, patterned cylinder, cylindrical nip rolls or guides, a UV lamp, a UV reservoir pan, light shields, a flexible thin web feed roll, a flexible thin web unwind roll, a flexible thin web take up roll, a flexible thin web wind up roll, and a doctor blade for controlling the coating thickness of the flexible thin web. In operation, the flexible web is directed from the unwind roll across the feed side, through the first set of nip rolls, around the feed roll and then around the peripheral surface of the engraved, patterned cylinder. As the web circulates the feed roll, it is coated with an uncured resin. Thereafter, it crosses the engraved, patterned cylinder, is exposed to UV radiation from the UV lamp, such that the uncured resin cues thereby having the pattern on the cylinder is transferred to the web. Thereafter, the web is directed around the take up roll through a second set of nip rolls and across the wind up side to the wind up roll.

In both exemplary embodiments, the light shields prevent damage from the UV lamps to the material prior to crossing the engraved pattern. Further, the UV reservoir pan contains an uncured resin such that as the cylinder rotates it's peripheral surface passes through the pan. Thereafter, as the material comes in contact with the cylinder the resin is compressed between the cylinder and the material during UV exposure. The doctor blade is provided and controls the coating thickness on the engraved patterned cylinder such that accurate reproductions of the pattern can be transferred to the sheet or web.

Optionally, the newly patterned web may be laminated to a thick rigid sheet by using the apparatus of the present invention. The optional lamination of a rigid sheet is performed by the addition of laminator nip rolls, a take up of patterned sheet with pressure sensitive adhesive thereon, directing a rigid sheet through the nip rolls such that the patterned sheet is adhered thereto, and a release liner take up roll.

In an alternative embodiment of the present invention, a base frame having a first and second end including a plurality of adjustable legs, a plurality of adjustable cross members and at least one vertical member is provided. Attached to the respective first and second ends of the base frame at the adjustable legs are a feed roll and a take up roll for a flexible web. Further, attached to the cross members in a predetermined location is an engraved patterned cylinder. The cylinder is situated such that the peripheral surface thereof extends above the base frame. Located on the cross members in predetermined locations are a plurality of adjustable and repositionable nip or guide rolls for directing the flexible web from the feed roll through the apparatus, around the engraved, patterned cylinder and through the nip rolls to the take up roll. Located above the engraved, patterned cylinder and affixed to the vertical member is a UV lamp for radiating the flexible web as it crosses over the peripheral surface of a coated cylinder. By radiating the flexible web and coated cylinder, the patterned relief of the cylinder is transferred to the web. At least one UV reservoir pan containing an uncured resin and doctor blade is provided such that the coating thickness of the cylinder is controlled, thereby ensuring that the patterned transferred to the sheet or web is accurate and more exact.

In order to accommodate a rigid sheet material, the adjustable nip rolls of the apparatus are repositioned such that the peripheral surface of the nip rolls is coincident with the peripheral surface of the cylinder. Thereafter, the rigid sheet is advanced through the nip rolls, across the cylinder and through the opposing nip rolls.

BRIEF DESCRIPTION OF THE DRAWINGS

Some of the features and advantages of the invention having been stated, other features and advantages will become apparent as the description proceeds, when taken in connection with the accompanying drawings, in which.

DETAILED DESCRIPTION OF THE INVENTION

The present invention will now be described more fully hereinafter with reference to the accompanying drawings, if any, in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers, if any, refer to like elements throughout the various drawings.

The present invention provides various embodiments of an apparatus and method for producing rigid composite lenticular sheets and/or thin, flexible film webs having a predetermined characteristic on one surface thereof. As is well known and understood in the art, lenticular lens material utilizes rows of simple and commonly dome shaped lenses or "lenticules" in combination with a line form or interlaced image, to create a desired visual effect. As used herein, the term "lenticular material" is intended to include any optical sheet, roll, film or web that is suitable for use in the printing arts and has a substantially transparent quality. Material compositions of such lenticular material may include, for example and without limitation, any acrylic, polycarbonate, polypropylene, polyester, polyethylene, polyvinylchloride, and polystryene that UV light or electron beams will pass through. All such compositions are considered to be polymeric materials and are synonymous therewith. In a preferable example, the lenticular material produced by the apparatus and method herein disclosed generally comprises a flat side and a lenticulated side including lenticules. An image is affixed, or reverse printed, to the flat side of the lenticular material thereby allowing a viewer to see the desired visual effect from the lenticulated side. The resulting product is an improved lenticular assembly that provides advantages over the prior art without the shortcomings.

In all of the exemplary embodiments shown and described throughout the specification, the present invention generally includes a structure having a table-like configuration with an open center provided with a at least one connection means for supporting at least one pair of nip or guide rolls and at least one engraved, patterned cylinder. As is understood by those skilled in the art, the term "engraved, patterned cylinder" is meant to include cylinders that are fabricated by first designing a cutting tool, such as a stylus, with a desired lens shape. The cutting tool is preferably made of a diamond or carbide, however, it will be understood by those in the art that any hard material suitable for engraving cylinders may be used. The shape of the cutting tool is dictated by the desired visual effect. Once the cutting tool is designed, the inverse lens shape is engraved into pre-selected portions of a metal cylinder using any known, conventional method of engraving, thereby forming a plurality of inverse lens arrays or patterns. Subsequent to engraving the cylinder, it is operable for use with the present invention in the transferring of the inverse lens pattern to the lenticular material by the extrusion embossment method herein described.

Figure 1:
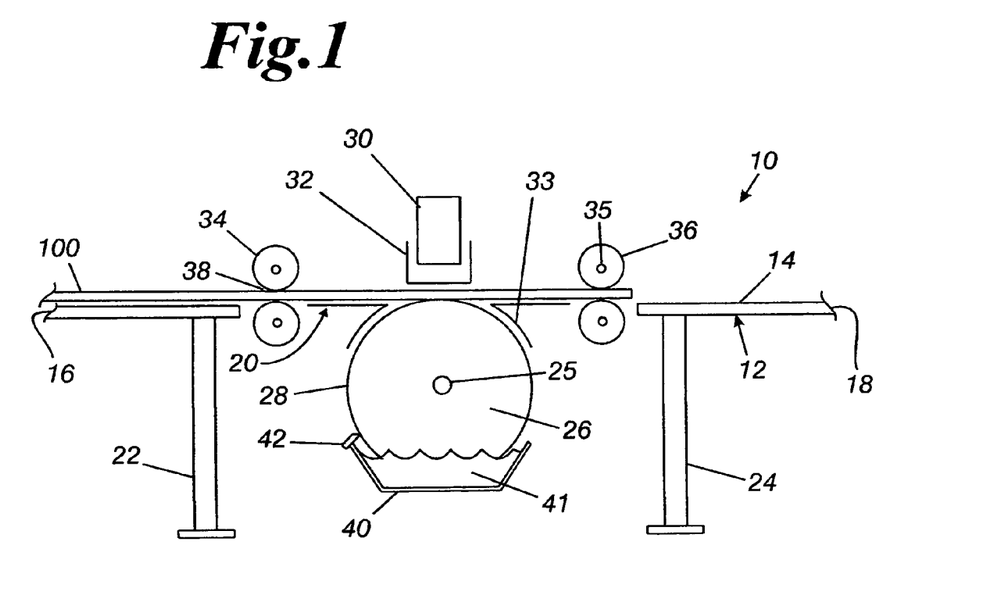
FIG. 1 is a schematic view showing one exemplary embodiment of the apparatus of this invention as used with a rigid composite sheet material.

Referring now to FIG. 1, a preferred embodiment of the disclosed apparatus and method of the present invention is shown wherein a rigid, composite sheet material 100 is produced. Generally, the apparatus 10 comprises a base frame 12 having a generally table like configuration including an upper surface 14 and opposing sides, 16 and 18 respectively, defining a central or intermediate opening 20. The opposing sides 16, 18 operate to function as a feed side 16 and a take up side 18. The base frame 12 also includes a plurality of legs, 22 and 24 respectively, for supporting the base frame 12 at a predetermined height and adjustable, connecting means (not shown) operable for use with a plurality of rolls. The legs 22, 24 are preferably adjustable in height such that they can be raised or lower as desired or required. Further, the central or intermediate opening 20 may be widened or narrowed as required. Disposed within the intermediate opening 20 and mounted to the base frame 12 along a substantially horizontal axis by the adjustable, connecting means is an elongate engraved, patterned cylindrical roll 26 for embossing the lenticular material 100 with a pre-determined relief pattern.

The cylindrical roll 26 preferably has respective shafts 25 extending from opposite ends thereof, and the shafts 25 are mounted into the connecting means. The connecting means are preferably pillow blocks that are adjustable in position by suitable means, such as a threaded shaft or spacers (not shown). By suitable adjustment of the connecting means, the cylindrical roll 26 can be raised or lowered, but is preferably fixed, in position relative to the upper surface 14 of the base frame 12. Also, connected to the roll 26 is suitable drive means (not shown), such as a gear train or belt train, for cooperating with the shafts 25 and rotating the roll 26 at a pre-determined speed in a predetermined direction. In the embodiment illustrated herein, the cylindrical roll 26 is mounted such that a peripheral surface 28 thereof is substantially planar with the upper surface 14 of the base frame 12.

At least one pair, and preferably two pairs, of nip or guides rolls, 34 and 36 respectively, are mounted to the base frame 12 on the opposing sides 16,18. The nip rolls 34,36 are generally of an elongate cylindrical shape and have a substantially smooth peripheral surface. The nip rolls 34,36 are mounted to the base frame 12 at the adjustable connecting means on parallel horizontally extending and horizontally spaced apart axes with the peripheral surfaces of the rolls 34,36 spaced apart a predetermined distance to form a narrow gap 38 of predetermined width corresponding to the desired overall thickness of the lenticular material 100. The rolls 34,36 have respective shafts 35 extending from opposite ends thereof, and the shafts 35 are mounted in the connecting means, preferably pillow blocks. The pillow blocks are mounted so as to be adjustably positionable with respect to one another by suitable means, such as a threaded shaft (not shown). By suitable adjustment of the connecting means, the spacing or position between the peripheral surfaces of the rolls 34,36 can be adjusted to thereby control the width of the narrow gap 38, and thus the thickness of the composite material 100 which is produced. Preferably, The lenticular material 100 is of a predetermined thickness less than the width of the narrow gap 38 between the nip rolls 34,36.

Suitable drive means (not shown), such as a gear train, cooperates with the shafts 35 and serves for rotating the nip rolls 34,36 at a substantially equal peripheral speed and in opposite directions of rotation. The horizontally-extending axes of the nip rolls 34,36 are laterally offset from one another such that the peripheral surface of each nip roll moves in a generally downward direction as it passes through the narrow gap 38.

Mounted below the cylindrical roll 26 to the base frame by secondary connecting means (not shown) is a UV reservoir pan 40 operable for retaining a resin 41 which coats the roll 26 as it rotates. The UV reservoir pan 40 applies to the exposed surface of the roll 26 a coating preferably of flowable uncured thermosetting resin. The UV reservoir pan 40 is defined by a series of retaining walls which closely conform to the outer peripheral surface 28 of the cylindrical roll 26. The generally upward movement of the peripheral surface 28 of the roll 26, together with the viscosity of the resin 41 prevents any substantial leakage of the resin 41 from the juncture between the retaining walls and the peripheral surface 28 of the roll 26. Connected to the UV reservoir pan 40 and pressured against the peripheral surface 28 of the cylindrical roll 26 is a doctor blade 42 or other control means. The doctor blade 42 is operable for maintaining or controlling coating thickness on the cylindrical roll 26.

As seen in FIG. 1, the rigid material 100 is first directed from the feed side 16 through the narrow gap 38 of the first pair of nip rolls 34. After passing through the narrow gap 38 between the first pair rolls 34, the material 100 comes in contact with the coated peripheral surface 28 of the cylindrical roll 26. The coating 41 of is thus located in contact with the surface 28 of the roll 26 and beneath the material 100. As the material 100 advances around the periphery 28 of the cylindrical roll 26 with the coating 41 in contact with the patterned relief surface of the roll 26, the uncured resin 41 is hardened and cured by exposure to a curing agent. Where an actinic radiation curable resin is used, the curing agent may comprise electron beam radiation or ultraviolet light. As illustrated, UV lamps 30 are located closely adjacent the cylindrical roll 26 and are oriented toward the roll 26 for directing ultraviolet light through the material 100 and into contact with the uncured flowable resin 41 therebelow. Exposure of the coating resin 41 to the UV radiation causes the resin 41 to cure and harden quickly so that by the time the resin coating 41 is separated from the molding surface of the cylindrical roll 26 it is in a hardened and shape sustaining state and accurately reproduces the pattern of the molding surface in the outer surface of the resin 41. The protective entrapment of the resin 41 between the material 100 and the roll 26 keeps the uncured resin 41 out of contact with the oxygen present in the ambient air and thus avoids the necessity of inert gas blanketing of the uncured resin as is conventionally needed in UV curing systems.

The UV lamps 30 are preferably located in a protective housing which fit closely above the periphery 28 of the cylindrical roll 26 so as to shield persons in the vicinity of the apparatus 10 from unwanted exposure to the ultraviolet light. As previously stated, the cylindrical roll 26 may, for example, have a relief patterned surface texture for producing various relief patterns in the surface of the lenticular material 100; or if desired, the cylindrical roll 26 may have a highly polished surface texture for producing a high quality blemish-free gloss surface without the surface imperfections often found in coatings which are dried or cured in contact with air or gas.

Joined to the base frame 12 and extending around a portion of the periphery of the cylindrical roll 26 is a dark plate 32 for preventing exposure of the roll 26 to the radiation exposed by the UV lamp 30. The dark plate 32 is operable for protecting the roll 26 from the radiation, thereby preventing distortion of the relief pattern engraved thereon. Further, light shields 33 are provided for added protection.

As indicated above, the coating thickness of the roll 26 is controlled by the doctor blade 42 and doctor blade pressure as opposed to the parallelism and roll uniformity plus bearing accuracy as taught by the prior art. Advantageously, by not having to rely on roll accuracy production of material, large material widths are possible. Coating thickness is usually little more than the depth of the pattern as the doctor blade 42 rides and wipes from the high points on engraved pattern. The doctor blade 42 is preferably of rubber or plastic construction such as high density polyethylene, nylon, polyurethane. However, it will be understood by those skilled in the art that other materials resistant to the coating composition. The doctor blade 42 may optionally be backed with a metal or other hard material bar to give additional rigidity and straightness which is needed for long length when producing a wide sheet. Further, it will be appreciated by those skilled in the art that while the thickness of the material 100 may vary to some extent, the thickness of the coating of resin 41 applied to the material 100 will compensatingly vary so that the overall thickness of the material 100 plus resin 41 coating is always uniform and corresponds to the predetermined spacing of the narrow gap 38. It will also be understood by those skilled in the art that the doctor blade 42 may optionally be a nip roll or a wire wound metering rod.

After passing across the cylindrical roll 26, the material 100 passes through the second pair of nip rolls 36 at the narrow gap 38 onto the take up side 18. As the coating 41 and material 100 passes through the narrow gap 38 of the second pair of nip rolls 36, the rolls 36 and gap 38 serve to further meter the coating 41 so as to define a predetermined thickness for the material 100 plus the coating 41 which corresponds to the width of the narrow gap 38. Importantly, by using the disclosed apparatus and method 10, rigid sheets may be produced having a variety of widths and thicknesses up to ¼ inch.

Figure 2:
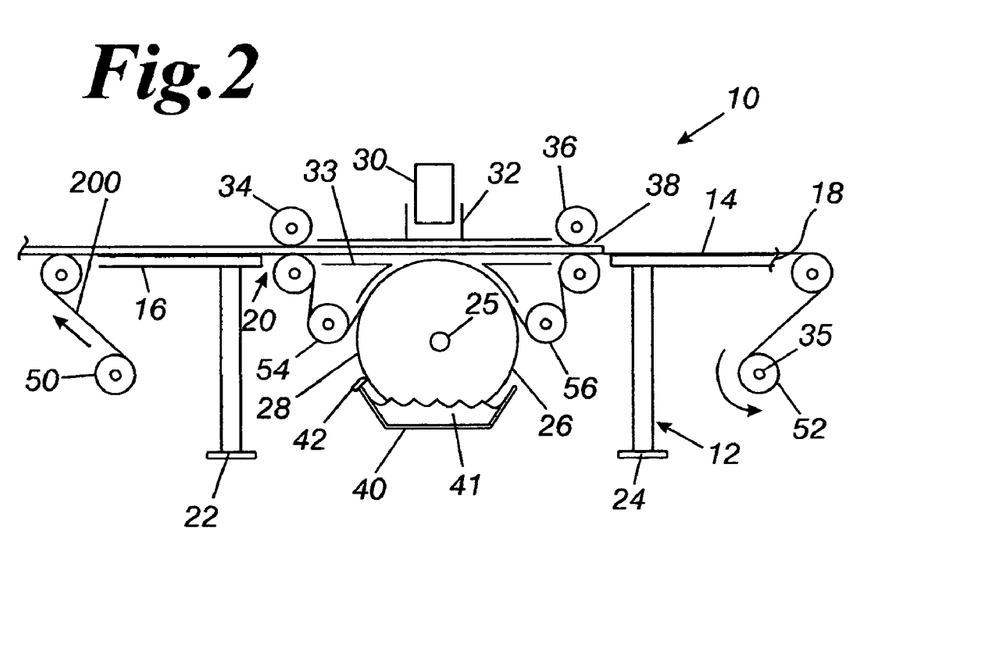
FIG. 2 is a schematic view showing one exemplary embodiment of the apparatus of this invention as used with a flexible thin web material.

Referring now to FIG. 2, a preferred embodiment of the disclosed apparatus 10 and method 10 of the present invention is shown wherein a thin flexible web material 200 is produced. Generally, the apparatus 10 comprises a base frame 12 having a generally table like configuration including an upper surface 14 and opposing sides, 16 and 18 respectively, defining a central or intermediate opening 20. The opposing sides operate to function as a feed side 16 and a take up side 18. The feed side 16 is provided with the addition of a flexible thin web unwind roll 50. Further, the take up side 18 is provided with the addition of a flexible, thin patterned web wind up roll 52. The base frame 12 also includes a plurality of legs, 22 and 24 respectively, for supporting the base frame 12 at a pre-determined height and adjustable, connecting means (not shown) operable for use with a plurality of rolls. The legs 22, 24 are preferably adjustable in height such that they can be raised or lower as desired or required. Further, the central or intermediate opening 20 may be widened or narrowed as required. Disposed within the intermediate opening 20 and mounted to the base frame 12 along a substantially horizontal axis by the adjustable, connecting means is an elongate engraved, patterned cylindrical roll 26 for embossing the lenticular material 200 with a pre-determined relief pattern.

The cylindrical roll 26 preferably has respective shafts 25 extending from opposite ends thereof (not shown), and the shafts 25 are mounted into the connecting means. The connecting means are preferably pillow blocks that are adjustable in position by suitable means, such as a threaded shaft (not shown). By suitable adjustment of the connecting means, the cylindrical roll 26 can be raised or lowered, but is preferably fixed, in position relative to the upper surface 14 of the base frame 12. Also, connected to the roll 26 is suitable drive means (not shown), such as a gear train or belt train, for cooperating with the shafts 25 and rotating the roll 26 at a pre-determined speed in a predetermined direction. In the embodiment illustrated herein, the cylindrical roll 26 is mounted such that a peripheral surface 28 thereof is substantially planar with the upper surface 14 of the base frame 12.

At least one pair, and preferably two pairs, of nip or guides rolls, 34 and 36 respectively, are mounted to the base frame 12 on the opposing sides 16,18. The nip rolls 34,36 are generally of an elongate cylindrical shape and have a substantially smooth peripheral surface. The nip rolls 34,36 are mounted to the base frame 12 at the adjustable connecting means on parallel horizontally extending and horizontally spaced apart axes with the peripheral surfaces of the rolls 34,36 spaced apart a predetermined distance to form a narrow gap 38 of predetermined width corresponding to the desired overall thickness of the lenticular material 100. The rolls 34,36 have respective shafts 35 extending from opposite ends thereof, and the shafts 35 are mounted in the connecting means, preferably pillow blocks. The pillow blocks are mounted so as to be adjustably positionable with respect to one another by suitable means, such as a threaded shaft (not shown). By suitable adjustment of the connecting means, the spacing or position between the peripheral surfaces of the rolls 34,36 can be adjusted to thereby control the width of the narrow gap 38, and thus the thickness of the composite material 200 which is produced. Preferably, The lenticular material 200 is of a predetermined thickness less than the width of the narrow gap 38 between the nip rolls 34,36.

Suitable drive means (not shown), such as a gear train, cooperates with the shafts 35 and serves for rotating the nip rolls 34,36 at a substantially equal peripheral speed and in opposite directions of rotation. The horizontally-extending axes of the nip rolls 34,36 are laterally offset from one another such that the peripheral surface of each nip roll moves in a generally downward direction as it passes through the narrow gap 38.

Mounted below the cylindrical roll 26 to the base frame by secondary connecting means (not shown) is a UV reservoir pan 40 operable for retaining a resin 41 which coats the roll 26 as it rotates. The UV reservoir pan 40 applies to the exposed surface of the roll 26 a coating preferably of flowable uncured thermosetting resin. The UV reservoir pan 40 is defined by a series of retaining walls which closely conform to the outer peripheral surface 28 of the cylindrical roll 26. The generally upward movement of the peripheral surface 28 of the roll 26, together with the viscosity of the resin 41 prevents any substantial leakage of the resin 41 from the juncture between the retaining walls and the peripheral surface 28 of the roll 26. Connected to the UV reservoir pan 40 and pressured against the peripheral surface 28 of the cylindrical roll 26 is a doctor blade 42 or other control means. The doctor blade 42 is operable for maintaining or controlling coating thickness on the cylindrical roll 26.

A feed roll 54 is mounted at connecting means (not shown) adjacent to the peripheral surface 28 of the cylindrical roll 26 for directing or feeding the web material 200 around a pre-determined arcuate length of the peripheral surface 28 of the cylindrical roll 26. Further, a peel off roll 56 is mounted to the base frame 12 at connecting means (not shown) adjacent to the peripheral surface 28 of the cylindrical roll 26 for peeling off the web material 200 from the roll 26 after it passes across the surface 28. Preferably, the feed roll 54 and the peel off roll 56 are located on opposing, but corresponding sides of the cylindrical roll 26.

As seen in FIG. 2, the thin, flexible material 200 is first directed from the feed roll 54 to the feed side 16 through the narrow gap 38 of the first pair of nip rolls 34. After passing through the narrow gap 38 between the first pair rolls 34, the material 200 advances around the peripheral surface of the feed roll 54. Thereafter, the material 200 comes in contact with the coated peripheral surface 28 of the cylindrical roll 26. The coating 41 is thus located in contact with the peripheral surface 28 of the roll 26 and beneath the material 200. As the material 200 advances around the periphery 28 of the cylindrical roll 26 with the coating 41 in contact with the patterned relief surface of the roll 26, the uncured resin 41 is hardened and cured by exposure to a curing agent. Where an actinic radiation curable resin is used, the curing agent may comprise electron beam radiation or ultraviolet light.

As illustrated, UV lamps 30 are located closely adjacent the cylindrical roll 26 and are oriented toward the roll 26 for directing ultraviolet light through the material 200 and into contact with the uncured flowable resin 41 therebelow. Exposure of the coating to the UV radiation causes the resin 41 to cure and harden quickly so that by the time the resin 41 is separated from the molding surface of the roll 26 it is in a hardened and shape sustaining state and accurately reproduces the pattern of the molding surface in the outer surface of the resin 41. The protective entrapment of the resin 41 between the material 200 and the roll 26 keeps the uncured resin 41 out of contact with the oxygen present in the ambient air and thus avoids the necessity of inert gas blanketing of the uncured resin 41 as is conventionally needed in UV curing systems.

The UV lamps 30 are preferably located in a protective housing which fit closely above the periphery 28 of the cylindrical roll 26 so as to shield persons in the vicinity of the apparatus from unwanted exposure to the ultraviolet light. As previously stated, the cylindrical roll 26 may, for example, have a relief patterned surface texture for producing various relief patterns in the surface of the lenticular material 200; or if desired, the cylindrical roll 26 may have a highly polished surface texture for producing a high quality blemish-free gloss surface without the surface imperfections often found in coatings which are dried or cured in contact with air or gas.

Joined to the base frame 12 and extending around a portion of the periphery of the cylindrical roll 26 is a dark plate 32 for preventing exposure of the roll 26 to the radiation exposed by the UV lamp 30. The dark plate 32 is operable for protecting the roll 26 from the radiation, thereby preventing distortion of the relief pattern engraved thereon. Further, light shields 33 are provided for added protection.

As indicated above, the coating thickness of the material 200 is controlled by the doctor blade 42 and doctor blade pressure and not the parallelism and roll uniformity plus bearing accuracy as taught by the prior art. Advantageously, by not having to rely on roll accuracy production of material, large widths is possible. Coating thickness is usually little more than the depth of the pattern as the doctor blade 42 rides and wipes from the high points on engraved pattern. The doctor blade 42 is preferably of rubber or plastic construction such as high density polyethylene, nylon, polyurethane. However, it will be understood by those skilled in the art that other materials resistant to the coating composition. The doctor blade 42 may optionally be backed with a metal or other hard material bar to give additional rigidity and straightness which is needed for long length when producing a wide web. Further, it will be appreciated by those skilled in the art that while the thickness of the material 200 may vary to some extent, the thickness of the coating of resin 41 applied to the material 200 will compensatingly vary so that the overall thickness of the material 200 plus resin 41 coating is always uniform and corresponds to the predetermined spacing of the narrow gap 38. It will also be understood by those skilled in the art that the doctor blade 42 may optionally be a nip roll or a wire wound metering rod.

After passing across the cylindrical roll 26, the material 200 and coating 41 passes around the periphery of the peel off roll 56 and through the second pair of nip rolls 36 at the narrow gap 38 onto the take up side 18. As the coating 41 and material 200 passes through the narrow gap 38 of the second pair of nip rolls 36, the rolls 36 and gap 38 serve to further meter the coating 41 so as to define a predetermined thickness for the material 200 plus the coating 41 which corresponds to the width of the narrow gap 38. Subsequent to passing along the take up side, the web material 200 is wound around the flexible, thin patterned wind up roll 52. Importantly, by using the disclosed apparatus and method 10, flexible thin webs may be produced having a variety of widths and thicknesses down to 0.001 inches or less.

With the selection of a stable, yet flexible material 200, a stable uniform patterned web is possible. A stable uniform web is not possible with an extruded web where the pattern is imparted to the thin web when the resin is molten. Since the pattern is cured from a liquid and solidified against the patterned roll, an accurate reproduction of the pattern is possible, which is not by extrusion. There is no heat required to form the pattern or initiate the cure or solidification of the liquid formulation.

Thin patterned web or sheet material 200 can be produced on present invention in continuous lengths or sheeted at the end of the machine by exposure of UV light through the material 200. The material 200 is optionally treated or pre-coated to bond to the cured resin. The material 200 can have a pressure sensitive adhesive or ink receptive coating pre coated on the opposite or back side thereof with a clear release liner. The adhesive coated patterned sheet can be laminated to another web or sheet material by removing the release liner and laminating through a nip roll. The ink receptive coating may be used to apply an image from an inkjet printer directly to the material 200.

The apparatus of the present invention provides a dual purpose in that both rigid pre extruded or cast sheet can be manufactured as well as thin flexible film or web. The apparatus permits this dual manufacture by providing the connecting means operable for receiving additional rolls. Further, as stated the connecting means are adjustably positionable such that the rolls can be manipulated into various positions to accommodate both thick, rigid sheet material and thin, flexible material. Heretofore, the prior art fails to provide such versatility, in that separate distinct machines were required for the manufacture of lenticular material having rigid or flexible properties. Further, and advantageously, test runs for certain materials and patterns can now be performed more cost effectively and efficiently.

Figure 3:
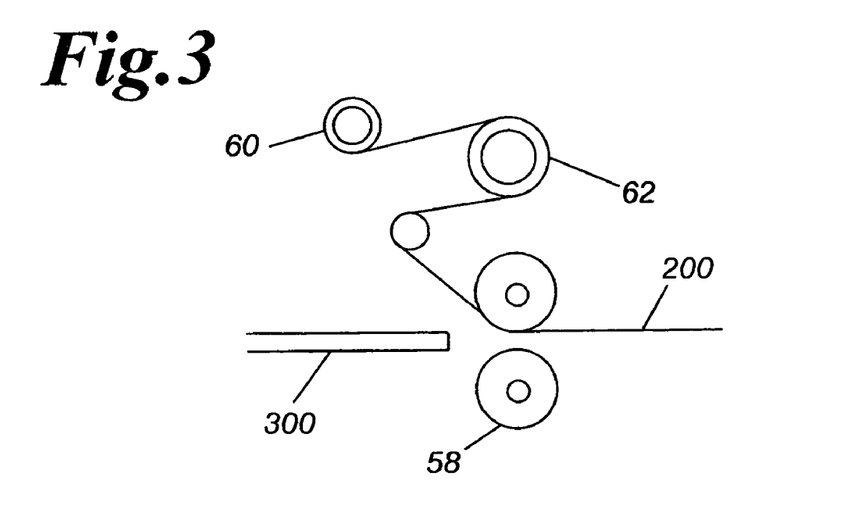
FIG. 3 is a schematic view showing another exemplary embodiment of the present invention wherein a flexible web is laminated to a rigid sheet.

Referring now to FIG. 3, the newly patterned web material 200 may be optionally laminated to a thick rigid sheet 300 by using the apparatus 10 of the present invention. The optional lamination of a rigid sheet 300 is performed by the addition of laminator nip rolls 58, an unwind of patterned sheet with pressure sensitive adhesive thereon 62, directing a rigid sheet 300 through the nip rolls 58 such that the patterned sheet is adhered thereto, and a release liner take up roll 60.

Figure 4:
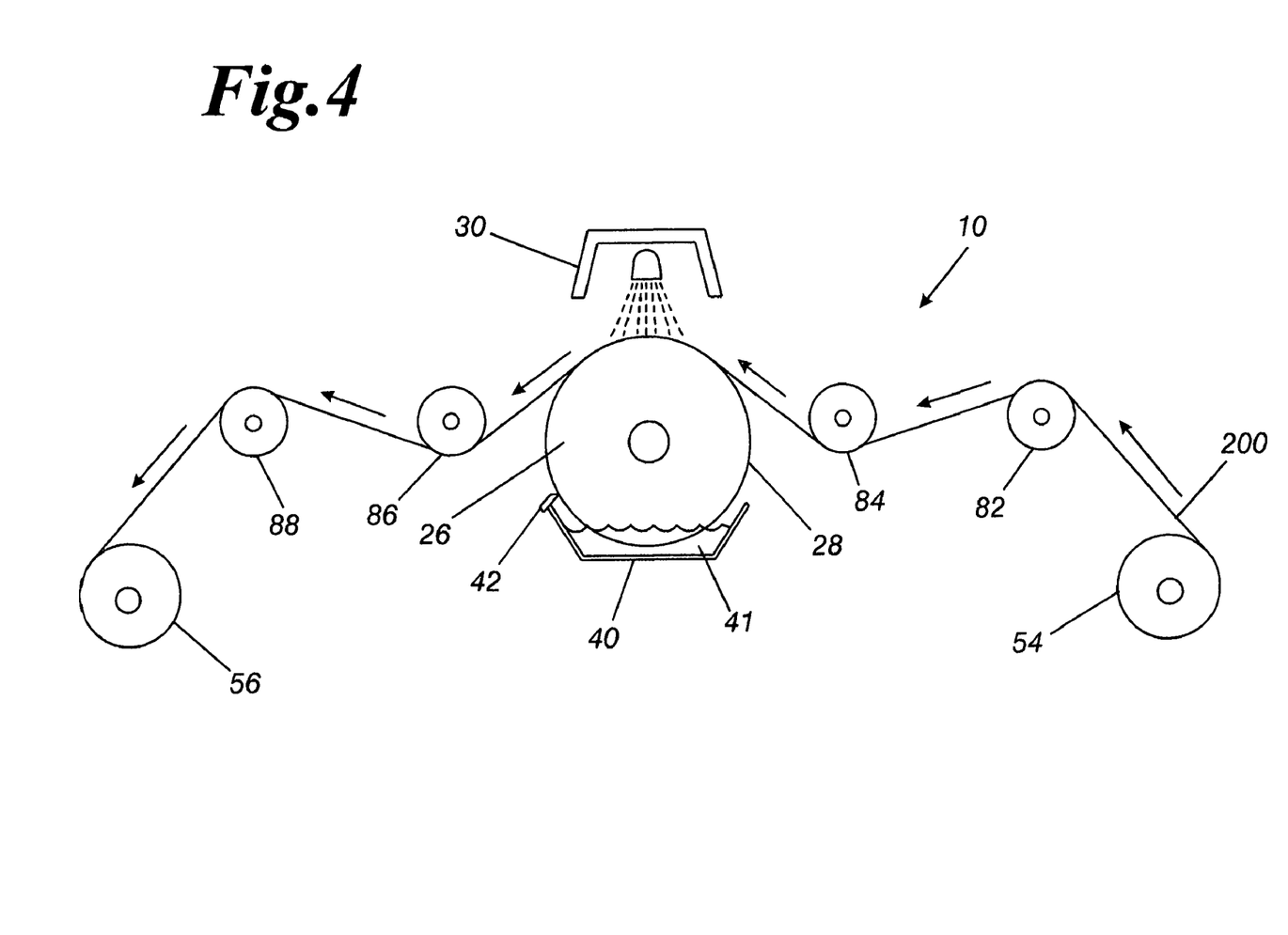
FIG. 4 is a schematic view of an alternative embodiment of the apparatus of present invention as used with a flexible thin web material.
Figure 5:
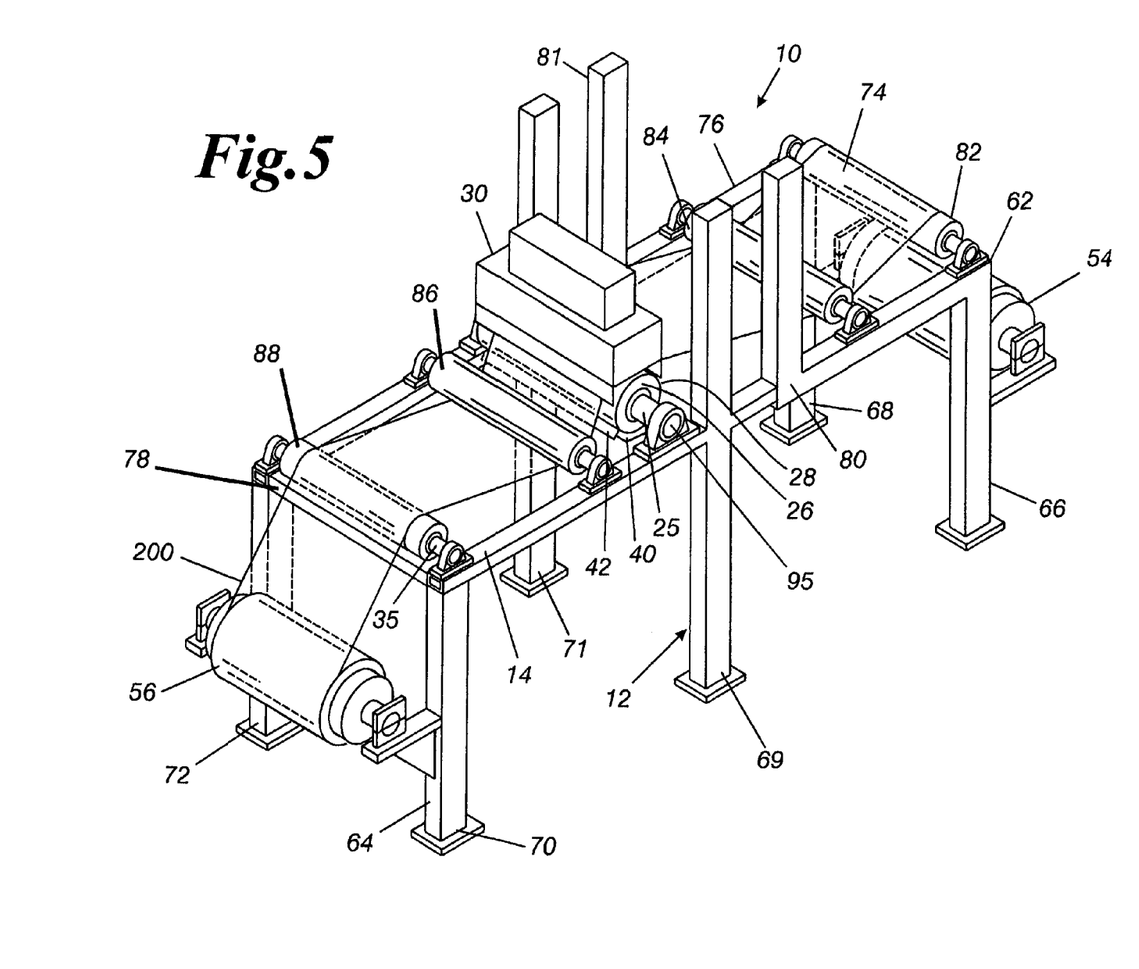
FIG. 5 is a perspective view of the alternative embodiment of the apparatus of present invention of FIG. 4 as used for flexible web material.

Referring now to FIGS. 4 and 5, an alternative embodiment of the present invention is shown wherein a thin, flexible patterned web 200 is produced. As shown, a base frame 12 having first and second ends 62 and 64 including a plurality of adjustable legs, 66, 68, 69, 70, 71 and 72 respectively, a plurality of adjustable cross members, 74, 76, 78, and 80 respectively, and at least one vertical member 81 is provided. Attached to the respective first and second ends 62,64 of the base frame 12 at the adjustable legs 66,68, 69,70, 71 and 72, are a feed roll 54 and a take up roll 56 for a flexible web. The feed roll 54 and take up roll 56 are attached or mounted to the legs by a connecting means 95. The connecting means 95 are preferably pillow blocks that are adjustable in position by suitable means. However, it will be understood by those skilled in the art that spacers may be used as well.

Further, attached to the cross members 74,76,78, and 80 by the connecting means 95 in a predetermined location is an engraved, patterned cylindrical roll 26. The cylindrical roll 26 is situated such that the peripheral surface 28 thereof extends above an upper surface 14 of the base frame 12. The cylindrical roll 26 preferably has respective shafts 25 extending from opposite ends thereof, and the shafts 25 are mounted to the connecting means 95. Also, connected to the roll 26 is suitable drive means (not shown), such as a gear train or belt train, for cooperating with the shafts 25 and rotating the roll 26 at a predetermined speed in a predetermined direction.

In addition, located on the cross members 74, 76, 78, and 80 in predetermined locations, at predetermined heights are a plurality of nip or guide rolls, 82, 84, 86 and 88 respectively, for directing the flexible web 200 from the feed roll 54 through the apparatus 10, around the engraved, patterned cylindrical roll 26 to the take up roll 56. The nip rolls 82, 84, 86 and 88 are generally of an elongate cylindrical shape and have a substantially smooth peripheral surface. The nip rolls 82, 84, 86 and 88 are mounted to the base frame 12 at the adjustable connecting means 95 on parallel horizontally extending axes. The rolls 82, 84, 86 and 88 have respective shafts 35 extending from opposite ends thereof, and the shafts 35 are mounted in the connecting means 95, preferably pillow blocks. The pillow blocks are mounted so as to be adjustably positionable with respect to one another by suitable means, such as a threaded shaft (not shown). By suitable adjustment of the connecting means 95, the spacing or position between the peripheral surfaces of the rolls 82, 84, 86 and 88 can be adjusted. Additionally, spacers may be provided to adjust the height of the rolls 82, 84, 86 and 88. By way of example, the rolls 82, 84, 86 and 88 may be adjusted such that the peripheral surfaces thereof are coincident with the peripheral surface 28 of the cylindrical roll 26. By making such an adjustment, the apparatus can accommodate a rigid sheet in addition to a flexible web. Suitable drive means (not shown), such as a gear train, cooperates with the shafts 35 and serves for rotating the nip rolls 82, 84, 86 and 88 at a substantially equal peripheral speeds of rotation.

Mounted below the cylindrical roll 26 to the base frame by secondary connecting means (not shown) is a UV reservoir pan 40 operable for retaining a resin which coats the roll 26 as it rotates. The UV reservoir pan 40 applies to the exposed surface of the roll 26 a coating preferably of flowable uncured thermosetting resin. The UV reservoir pan 40 is defined by a series of retaining walls which closely conform to the outer peripheral surface 28 of the cylindrical roll 26. The generally upward movement of the peripheral surface 28 of the roll 26, together with the viscosity of the resin prevents any substantial leakage of the resin from the juncture between the retaining walls and the peripheral surface 28 of the roll 26. Connected to the UV reservoir pan 40 and pressured against the peripheral surface 28 of the cylindrical roll 26 is a doctor blade 42 or other control means. The doctor blade 42 is operable for maintaining or controlling coating thickness on the cylindrical roll 26.

Located above the engraved, patterned cylindrical roll 26 and affixed to a vertical member 81 are UV lamps 30 for radiating the flexible web 200 and coating as it crosses over a peripheral surface 28 of the cylindrical roll 26. By radiating the flexible web 200 and coating, the patterned relief of the cylindrical roll 26 is transferred to the web 200.

Figure 6:
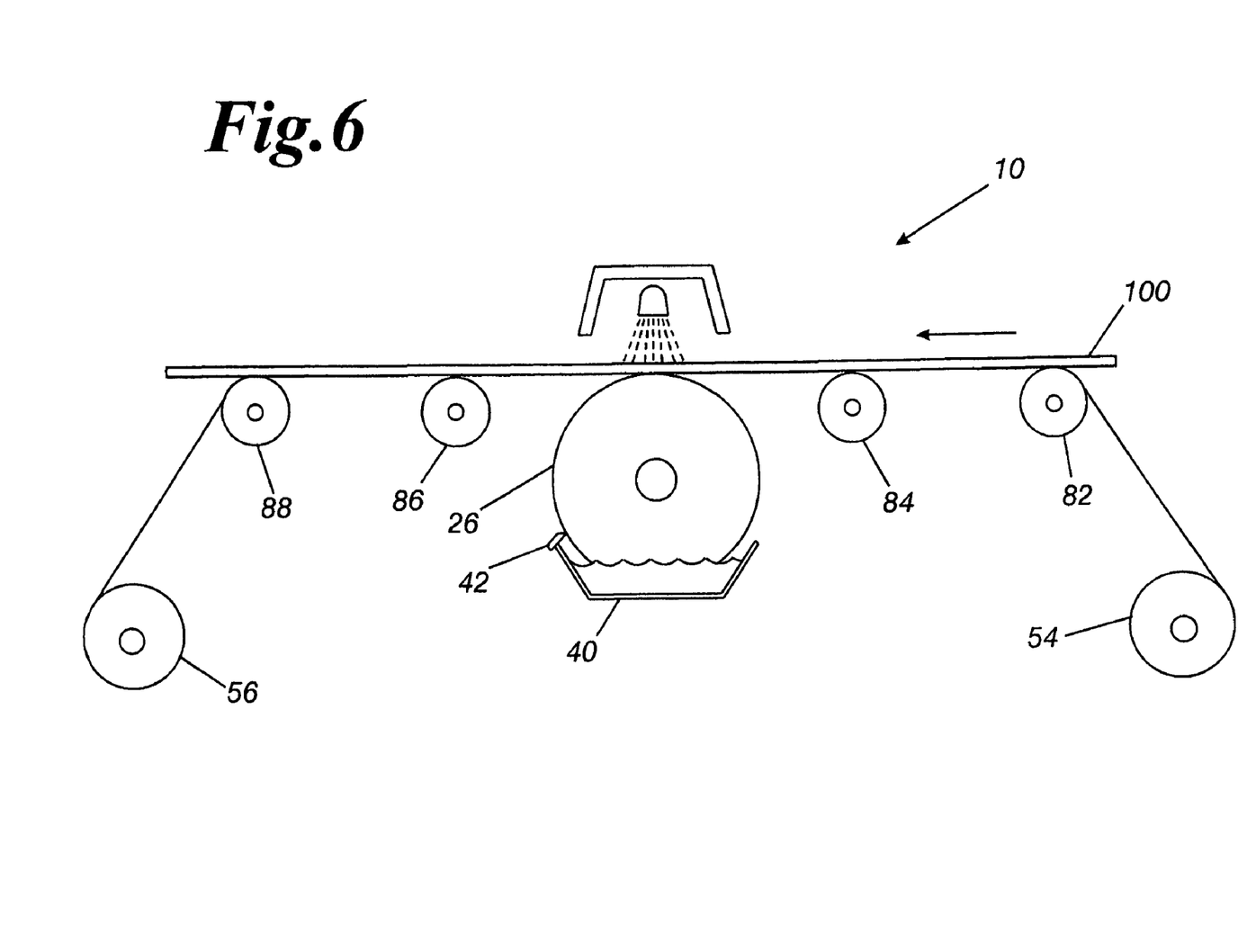
FIG. 6 is a perspective view of the alternative embodiment of the apparatus of the present invention of FIG. 4 as used for rigid sheet material.

As shown in FIG. 4, the nip or guide rolls 82, 84, 86, and 88 are spaced apart at a predetermined distance for directing the flexible web 200 through the apparatus 10. It will be understood by those skilled in the art, that by adjusting the connecting means 95 on the cross members 74, 76, 78 and 80, one can manipulate the cylindrical roll 26 and the nip or guide rolls 82, 84, 86 and 88 to accommodate a rigid sheet 100 as opposed to the thin, flexible web 200 (see, FIG. 6).

In all of the above referenced embodiments, during the operation of the apparatus of the present invention, the cylindrical roll 26 is heated by exposure to the ultraviolet radiation from the UV lamps 30 and by heat generated from an exothermic reaction which takes place during the curing of the resin. In order to remove the heat from the cylindrical roll 26 and to maintain the peripheral surface 28 thereof at a desirable operating temperature, an optional means may be provided for circulating a liquid coolant through a hollow interior of the roll 26. Preferably, the optional means may include a liquid cooling unit having supply and return conduits interconnecting with the cooling unit for circulating the coolant into and through the roll 26.

The foregoing is a description of the various embodiments of the present invention that are provided here by way of example only. Although the apparatus and method of the present invention has been described with reference to the preferred embodiments and examples thereof, other embodiments and examples may perform similar functions and/or achieve similar results. All such equivalent embodiments and examples are within the spirit and scope of the present invention and are intended to be covered by the appended claims. Although specific terms are employed herein, they are used in a generic and descriptive sense only and not for purposes of limitation.

That which is claimed is:

1. An apparatus for producing a lenticular material having a predetermined surface characteristic of high quality and fine definition formed on one side thereof, said apparatus comprising:

an adjustable base frame having an adjustable opening disposed therein;

a cylindrical roll supported within the opening of the base frame and having a peripheral surface of a predetermined texture corresponding to the desired surface characteristic to be produced in the material, said cylindrical roll being adjustable with the base frame to accommodate flexible web materials and rigid sheet materials;

a first pair of corresponding adjustable nip rolls being spaced apart at a predetermined distance to form a fixed narrow gap of predetermined width therebetween;

a drive mechanism operatively connected to said cylindrical roll for rotating said cylindrical roll at a predetermined speed of rotation;

means for directing the material through the narrow gap onto the peripheral surface of said cylindrical roll and over a predetermined arcuate path therealong;

a reservoir operable for applying to the exposed surface of the cylindrical roll as it rotates a coating of a flowable uncured thermosetting resin;

at least one heat source for curing the coating of uncured thermosetting resin while it is in contact with the peripheral surface of said cylindrical roll and the material to cure and harden the coating;

a doctor blade for controlling the coating thickness of the cylindrical roll; and a second pair of nip rolls for directing the material away from said cylindrical roll to thereby separate the cured coating from the peripheral surface of said cylindrical roll and to thus provide a material with a predetermined surface characteristic of high quality and fine definition.

2. The apparatus as set forth in claim 1, wherein said at least one heat source comprises an actinic radiation source located closely adjacent to and oriented toward said cylindrical roll for directing actinic radiation through said sheet or web and into contact with the coating of resin therebeneath.

3. The apparatus as set forth in claim 1, wherein the peripheral surface of said cylindrical roll has a polished smooth texture.

4. The apparatus as set forth in claim 1, wherein the peripheral surface of said cylindrical roll has a relief patterned texture.

5. The apparatus as set forth in claim 1, wherein the peripheral surface of said cylindrical roll has a series of narrow parallel cavities therein of substantially uniform size and shape for producing a series of elongate parallel riblike lenticular formations of narrow width, substantially uniform size and shape, and of fine definition and lenslike quality in the outer surface of the sheet or web.

6. The apparatus of claim 1, wherein the material is a flexible thin web.

7. The apparatus of claim 1, wherein the material is a rigid composite sheet.

8. An apparatus for producing a lenticular material having a predetermined surface characteristic of high quality and definition formed on one side thereof, said apparatus comprising:

an adjustable frame having an adjustable opening disposed therein;

a cylindrical roll disposed within the opening and having a peripheral surface of a predetermined texture corresponding to the desired surface characteristic to be produced in the material, said cylindrical roll being adjustable with the base frame to accommodate flexible web materials and rigid sheet materials;

a plurality of adjustable nip rolls for directing the flow of the material around the peripheral surface of the cylindrical roll;

means for mounting said nip rolls on parallel horizontally extending axes with the peripheral surface of the nip rolls spaced apart a predetermined distance to form a fixed narrow gap of predetermined width corresponding to the desired overall thickness of the material;

means operatively connected to each of said nip rolls for rotating said nip rolls at substantially equal peripheral speeds and in opposite directions of rotation such that the peripheral surfaces of both rolls move in a generally downward direction as they pass through said narrow gap;

means for directing the material along a predetermined path of travel and around the peripheral surface of said cylindrical roll and over a predetermined arcuate path therealong and passing through the narrow gap between said nip rolls;

means for maintaining a flowable solvent-free actinic radiation curable thermosetting resin material and coating the cylindrical roll and material with flowable uncured resin material;

means for directing actinic radiation onto the coating of resin located in contact with the peripheral surface of said cylindrical roll to thereby cure and harden the radiation curable coating while in contact with the peripheral surface of said cylindrical roll; and means controlling the coating thickness of the cylindrical roll and material.

9. The apparatus as set forth in claim 8, wherein said means for directing radiation onto the coating of resin comprises a radiation source located adjacent to said cylindrical roll and positioned for directing the radiation through the material and into contact with the radiation curable coating.

10. The apparatus as set forth in claim 8, wherein said means for mounting said nip rolls includes means for adjusting the width of the narrow gap between said peripheral surfaces of said rolls as well as the position of the nip rolls for accommodating the material.

11. The apparatus as set forth in claim 8, wherein the material is a flexible thin web.

12. The apparatus according to claim 8, wherein the material is a rigid composite sheet.

* * * * *